UNITED STATES PATENT OFFICE.

FREDERICK LICHT, OF BROOKLYN, NEW YORK.

PROCESS OF TREATING UNMALTED CEREALS FOR THE MANUFACTURE OF FERMENTED BEVERAGES.

SPECIFICATION forming part of Letters Patent No. 288,076, dated November 6, 1883.

Application filed August 27, 1883. (No specimens.)

*To all whom it may concern:*

Be it known that I, FREDERICK LICHT, a citizen of the United States, residing at Brooklyn, E. D., Kings county, New York, have invented new and useful Improvements in Process of Treating Unmalted Cereals for the Manufacture of Fermented Beverages, of which the following is a specification.

My invention relates to the manufacture of fermented beverages, the object thereof being to enable the use of unmalted cereals in combination with hops and malts, whereby a greater yield is obtained from the grain, the quality of the beer is improved, and the cost of manufacture is materially lessened.

By the ordinary process of brewing, the grain is first malted by steeping, after which it is removed from the cistern to the couch where it remains, gradually increasing in temperature until the roots make their appearance. The growth of these roots is checked and the temperature of the mass lessened by flooring, which occupies about fourteen days, when the stem, which appears soon after the sprouting of the roots, has grown until it reaches the end of the seed. Its further growth is then stopped by drying the malt in kilns. It is then screened to separate the grain from the radicle and ground, after which it is mashed in the usual manner. It is well known that malt so prepared contains far more diastase than is necessary to convert its starch into sugar. Moreover, by the process of malting there is a loss of about ten per cent., caused by the removal of soluble matters during the steeping of the grain by the percentage of carbon converted into carbonic acid, and by the conversion of hydrogen into water. It is the object of my invention to prevent this loss by which I secure an increase of ten per cent. in the yield from a given quantity of grain, and to cheapen the production by greatly reducing the amount of malt employed and mingling therewith unmalted grain, which is prepared for that purpose.

It has also been proposed to subject the grain to the action of a dry fire-heat until the grain has become friable, then let it cool and afterward pass it between rolls; also, in the same process it has been proposed to moisten the grain before or during the process of torrefaction.

It has further been proposed to subject the grain to the direct action of steam, and after the grain has been softened thereby to press and dry the product.

It has further been proposed to roast the grain until it bursts or breaks open and afterward reduce it to a fine meal.

It has also been proposed in the manufacture of flour to dry the grain by gravitating it through a chamber surrounded by a steam-jacket, and while hot passing it between the grinding-stones to reduce it to flour.

All the above methods, wherein it is contemplated to reduce the grain to a fine flour or meal, imply the heating of the grain until it shall become brittle enough to permit it to be pulverized by the grinding process. When heated to that extent the grain, if used for brewing, will impart an unpleasant flavor to the beer, and the yield therefrom will not be large as when treated by my process.

It has also been proposed to prepare grain for use as an article of food by subjecting it to heat in a chamber surrounded by a steam-chest until the kernel is rendered friable, so as to be easily pulverized, the grain then being removed from the chamber and cooled and afterward put up either in the kernel or comminuted in suitable form for commerce or the consumer.

My invention therefore consists in subjecting the grain to the action of heat evolved from a steam-heated surface until in a condition to be crushed and flattened without being comminuted into flour and then while heated passing it between crushing-rollers till crushed and flattened, whereby its particles may be more readily reached and dissolved in the mash and the yield increased.

In carrying out my invention I take any suitable cereal—such as corn, wheat, rye, oats, rice, &c., either separately or having two or more varieties mingled together. After cleaning the grain by any suitable and well-known means I subject it to a heat evolved from a steam-heated surface, preferably by passing it by means of conveyers through tubes which are either surrounded by a steam-jacket or provided with exterior or interior steam-heating pipes until the grain is in condition to be crushed and flattened without reduction to flour by being passed between crushing-rollers. By this means the grain is toughened, and is at the same time killed so that germination will not take place. It is then, while heated, crushed and flattened without reduction to flour by passing it between crushing-rolls. The grain thus prepared is mingled with malt in any suitable proportion—say one part of grain to two parts of malt, being that ordinarily used—and the whole is mashed. The usual quantity of hops may be added to the wort, which is boiled and treated in the well-known manner.

Having thus described my invention, what I claim, is—

1. The process herein described of preparing unmalted grain, said process consisting in subjecting the grain to the action of heat evolved from a steam-heated surface until in a condition to be crushed and flattened without reduction to flour by passing between crushing-rolls, and then while still heated passing it between crushing-rollers, substantially as set forth.

2. The process herein described of preparing and using unmalted grain in brewing, said process consisting in subjecting the grain to the action of heat evolved from a steam-heated surface until in a condition to be crushed and flattened without reduction to flour by passing between crushing-rolls, then, while still heated, passing it between crushing-rolls, then mingling it with malt, and finally mashing the whole, substantially as set forth.

FREDERICK LICHT.

Witnesses:
S. M. MEEKER, Jr.,
H. N. MEEKER.